United States Patent [19]

Lang et al.

[11] Patent Number: 5,141,084
[45] Date of Patent: Aug. 25, 1992

[54] BRAKE STOP

[75] Inventors: David J. Lang; David E. Russ, both of Rockford, Ill.

[73] Assignee: Sundstrand Corporation, Rockford, Ill.

[21] Appl. No.: 589,514

[22] Filed: Sep. 28, 1990

[51] Int. Cl.⁵ .............................. B60T 7/12
[52] U.S. Cl. .......................... 188/82.2; 188/71.4; 188/82.74; 192/7; 192/8 R; 244/46
[58] Field of Search ............ 188/82.1, 82.2, 82.3, 188/82.34, 82.74, 82.7, 82.84, 82.4, 82.9, 82.5, 72.1, 71.5, 71.3, 72.7, 73.2, 72.2, 82.77; 192/7, 8 R, 41 R, 43, 44, 45; 74/412 R, 431; 244/46, 75 R

[56] References Cited

U.S. PATENT DOCUMENTS

| | | | |
|---|---|---|---|
| 1,795,058 | 3/1931 | Townsend | 188/82.9 |
| 2,474,986 | 8/1949 | Thomas | 188/82.74 |
| 2,962,128 | 11/1960 | Luenberger | 188/82.84 |
| 3,433,332 | 3/1969 | Braun | 188/82.74 |
| 3,750,783 | 8/1973 | Ohtsuka et al. | 188/82.4 |
| 3,900,089 | 8/1975 | Ivey | 188/829 |
| 4,064,981 | 12/1977 | House et al. | 192/141 |
| 4,278,151 | 7/1981 | Kessinger, Jr. | 188/71.4 |
| 4,458,789 | 7/1984 | Cole | 188/71.5 |
| 4,480,733 | 11/1984 | Grimm et al. | 192/8 R |
| 4,545,470 | 10/1985 | Grimm | 192/56 R |
| 4,667,779 | 5/1987 | Lang | 188/71.2 |
| 4,693,349 | 9/1987 | Tysver | 192/7 |
| 4,697,672 | 10/1987 | Linton | 188/134 |
| 4,750,593 | 6/1988 | Matsuyama | 188/72.7 |
| 4,834,225 | 5/1989 | Klopfenstein et al. | 192/7 |

Primary Examiner—Matthew C. Graham
Attorney, Agent, or Firm—Antonelli, Terry, Stout & Kraus

[57] ABSTRACT

A brake stop for limiting the rotation of a rotating member to a predetermined amount comprises a brake which is actuable for stopping rotation of the rotating member and an actuator mechanism responsive to the rotation of the rotating member for actuating the brake after a predetermined amount of rotation of the rotating member. The actuator mechanism includes a differential counter gear set and a ball-ramp mechanism which converts rotary motion of the rotating member by way of the differential counter gear set into linear motion for actuation of the brake. Provision is made for sufficient lost motion or backlash in the differential counter gear set upon reversal of gear rotation to allow release of the brake from a braked condition upon reversal of the direction of rotation of the rotating member.

31 Claims, 4 Drawing Sheets

BRAKE STOP

TECHNICAL FIELD

The present invention relates to a brake stop for limiting the rotation of a rotating member after a predetermined amount of rotation of the member and an actuator employing the brake stop for operating a device with a preprogrammed, limited stroke. The device being operated can be an adjustable surface such a wing sweep mechanism on an aircraft.

BACKGROUND ART

Actuation systems, e.g. rotation ball screw type actuators for adjusting surfaces on an aircraft, generally have high rotational energy due to high motor operating speeds. These systems usually are incapable of sustaining the loading resulting from engaging hard stops, for example jaw/dog stops, at full system rates. Two approaches have been used to circumvent this problem. One method is to provide a sufficiently soft spring rate at the dog stops to reduce the inertia loading. The spring rate method, however, due to some system configurations may not provide the lightest weight system.

Another method is to use a gradually applied brake as the stop mechanism. Brake stops that are engaged by a mechanism contained within the actuation system may be difficult to release. The inertia energy dissipated in the brake stop may result in locking the brake and preventing the continued operation of the system. In an attempt to eliminate this problem, it is known from U.S. Pat. No. 4,667,779, for example, to employ a one-way clutch which results in a unidirectional brake stop. The use of dual high and low efficiency screw threads to eliminate this problem has also been proposed as in U.S. Pat. No. 4,064,981.

An energy absorbing bidirectional rachet no-back apparatus is disclosed in U.S. Pat. No. 4,480,733. The disclosed apparatus includes in combination a fixed support, a rotatable input member and a rotatable output member. A planetary gear friction couples the output shaft through a ring gear, and compound planet gears on a carrier, including also a ball-ramp torque limiter actuator. No-back mechanisms are also known from U.S. Pat. Nos. 4,834,225 and 4,697,672. These no-back apparatus of the prior art are designed to prevent driven loads from back driving a system if the system motors are inoperative. They do not stop motor operation based on system output position.

U.S. Pat. No. 4,545,470 is directed to a narrow tolerance range slip clutch which controls the amount of torque transmitted between two rotating shafts. The clutch does not stop or prevent rotation of either shaft based on shaft position. U.S. Pat. No. 4,693,349 discloses a torque limiting apparatus which restricts the amount of load a mechanism may encounter due to the system motors. Systems utilizing these components are subjected to inertia spike loads associated with the relatively sudden engagement of these load limiting mechanisms. U.S. Pat. No. 4,458,789 discloses a brake assembly for a multi-disc brake including a force multiplying device. The pneumatically actuated disc brake uses ball-ramps for force multiplying. U.S. Pat. No. 4,750,593 is directed to a disc brake for service combined with parking operation. The disc brake employs a ball-ramp mechanism for actuating the brake.

DISCLOSURE OF INVENTION

An object of the present invention is to provide an improved brake stop and an actuator employing the same, which are capable of absorbing substantial energy and providing a gradual stop to a rotating member having high rotational energy. A further object of the invention is to provide an improved brake stop and an actuator employing the same which overcome the aforementioned problems with respect to releasing the brake after braking, without use of one-way clutches or dual high and low efficiency screw threads as in the prior art brake stops referred to above.

These and other objects of the invention are attained by the improved brake stop of the invention for limiting the rotation of a rotating member after a predetermined amount of rotation of the member. The brake stop comprises a brake which is actuatable for stopping rotation of the rotating member and an actuator mechanism responsive to the rotation of the rotating member for actuating the brake stop to stop rotation of the rotating member after a predetermined amount of rotation of the member. The ,actuator mechanism includes a gear train having a plurality of intermeshing gears which are driven by the rotating member when rotated in either of two opposite directions for transferring power from the rotating member to actuate the brake. The gear train includes sufficient lost motion upon reversal of gear rotation to allow release of the brake from a braked condition upon reversal of the direction of rotation of the rotating member.

A mechanism for providing sufficient lost motion in a first embodiment of the invention comprises a jaw clutch located between respective gears of the drive train. In another form of the invention the lost motion or backlash is provided by the backlash between teeth of the intermeshing gears.

In the disclosed embodiments, the gear train of the brake stop is a differential counter gear set which comprises a first gear connected to the rotating member for rotation therewith. Second and third idle gears of the gear set are connected to each other for rotation about a common axis spaced from an axis of rotation of the rotating member. The second idle gear is located in intermeshing engagement with the first gear. A fourth gear is rotatably supported adjacent the first gear for rotation about the axis of rotation of the rotating member relative to the first gear. The third gear intermeshes with the fourth gear for rotatably driving the same in response to rotation of the rotating member. The gear ratios of the intermeshing gears of the differential counter gear set are selected so that the fourth gear is rotated slower than the first gear upon rotation of the rotating member.

According to a further feature of the invention, a ball-ramp mechanism is formed between the first and fourth gears of the differential counter gear set for transmitting rotary motion from the rotating member into linear motion for actuation of the brake after a predetermined amount of rotation of the member.

As an additional feature of the brake stop, the brake gain of the brake is greater than one. The brake stop is bidirectional in that the actuator mechanism responds to rotation of the rotating member in either of two opposite directions about an axis of rotational of the rotating member to actuate the brake to stop rotation after a predetermined amount of rotation. This predetermined amount of rotation is detected by the ball-ramp mechanism of the brake stop which serves as a timing device for actuating the brake after the predetermined amount of rotation. In particular, tangential ball grooves in the adjacent first and fourth gears, balls in opposed ball grooves and ramps at the ends of the ball grooves result in the application of a brake pack axial clamping force once the lost motion provided in the ball-ramp mechanism by the ball grooves has been exceeded.

The brake stop in the disclosed embodiments of the invention further comprises a device for controlling backlash in the gear drive at least when the rotating member approaches the predetermined amount of rotation. The means backlash control device applies a torque to the gear train in the same direction as a braking torque applied to the gear train by the brake when the brake is actuated. In a first embodiment of the invention the backlash control device comprises a helical torsion spring which is wound up in response to the driving of the gear train by the rotating member for applying a torque to the gear train in the same direction as the braking torque. A second embodiment of the invention employs a ball detent device which is actuated by movement of the gear train as the backlash control device to apply a torque thereto in the same direction as the braking torque when the rotating member approaches the predetermined amount of travel. The backlash control device of the brake stop ensures controlled brake application.

The brake of the brake stop in the disclosed embodiments comprises a brake pack which is pressed by the actuator mechanism for actuating the brake and a dual spring for yieldably resisting the pressure on the brake pack from the actuator means. The dual spring includes a first spring having a relatively lower spring rate which results in a relatively lower load on the brake pack and consequently relatively lower brake torque during an initial compression of the spring means and a second spring having a relatively higher spring rate which results in a relatively higher load on the brake pack and consequentially a relatively higher brake torque during a further compression of the spring means. The use of dual springs with different spring rates accommodates friction coefficient variations.

An actuator according to the invention for operating a device such as a wing sweep mechanism on an aircraft with a preprogrammed limited stroke, comprises a motor for operating the device to be actuated with a preprogrammed limited stroke, a member which is drivingly connected to the motor such that the member is rotated by the motor during operation of the device by the motor, the member being adapted to be stopped for stopping the operation of the device to limit the stroke thereof to a predetermined amount, and a brake stop according to the invention for limiting the rotation of the rotating member and thereby the stroke of the device. With the actuator, the high rotational energy due to high motor operating speed is dissipated by the brake to prevent overtravel of the device actuated by the actuator without the need for one-way clutches or dual high and low efficiency screw threads.

These and other objects, features and advantages of the present invention will become more apparent from the following description when taken in connection with the accompanying drawings which show, for purposes of illustration only, two preferred embodiments in accordance with the present invention.

BEST MODE FOR CARRYING OUT THE INVENTION

Figure 1:
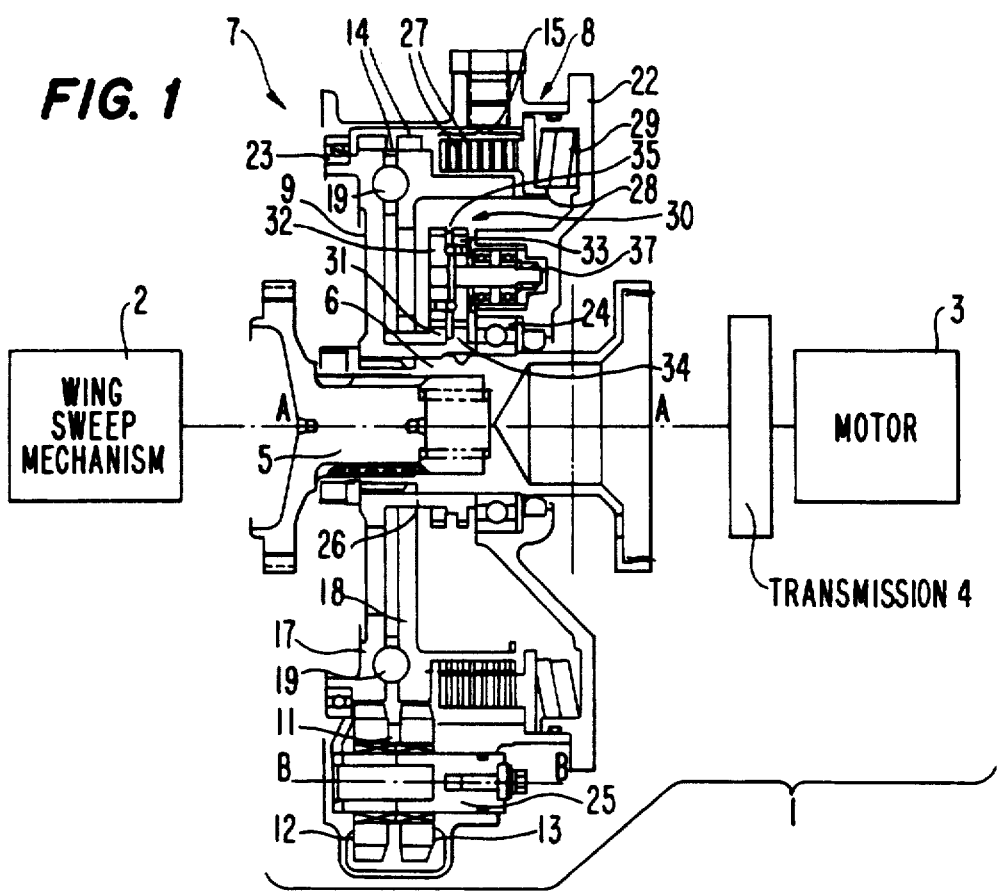
FIG. 1 a cross-sectional view of an actuator with a brake stop according to a first embodiment of the invention, taken along the axis of rotation of a rotating member of the brake stop drivingly connecting a motor of the actuator to a device to be actuated, particularly a wing sweep mechanism of an aircraft.

Referring now to the drawings, an actuator according to the invention for operating a wing sweep mechanism 2 of an aircraft is shown in FIG. 1. The actuator comprises a drive motor 3, a hydraulic motor in the disclosed embodiment, but other types of motors could be employed. The drive motor 3 is capable of being operated in each of two, opposite directions for rotatably driving a ball screw mechanism, not shown, of the wing sweep mechanism by way of a transmission 4 for causing the wing to sweep in a controlled manner back and forth over a limited, predetermined operating range.

Splined shafts 5 and 6 are rotated by the drive motor 3 during operation of the wing sweep mechanism 2 by the motor 3. The actuator 1 further comprises a brake stop 7 for limiting the rotation of the spline shafts 5 and 6 and thereby the stroke of the wing sweep mechanism 2. That is, the splined shafts 5 and 6 are adapted to be stopped by means of the brake stop 7 for stopping the operation of the wing sweep mechanism 2 and also the drive motor 3 at the desired ends of travel of the wing sweep mechanism 2 through the application of a brake 8 of the brake stop 7.

Figure 2:
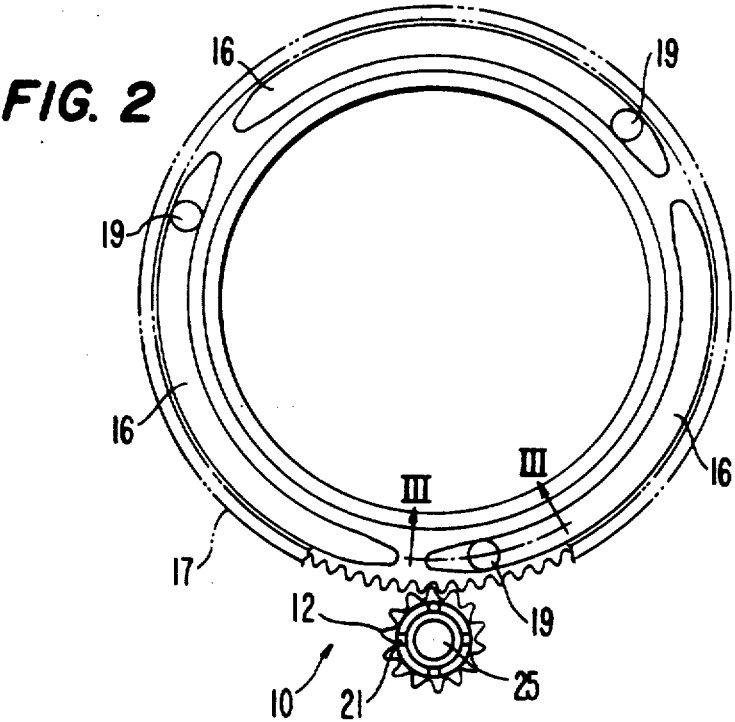
FIG. 2 is a cross-sectional view of the differential counter gear set of the brake stop of FIG. 1 taken perpendicular to the axis of rotation of a first gear of the set and illustrating the first gear thereof, an intermeshing idle gear of a pair of idle gears of the set, a shaft therefor and a jaw clutch arranged between the adjacent pair of idle gears.

More particularly, the brake stop 7 according to the invention, comprises the brake 8 which is actuable for stopping rotation of the splined shafts 5 and 6 and an actuator mechanism 9 responsive to the rotation of the shafts 5 and 6 for actuating the brake 8 to stop rotation of the shafts after a predetermined amount of rotation thereof, corresponding to a predetermined movement of the wing sweep mechanism. The actuator mechanism 9 includes a gear train 10 (FIG. 2) in the form of a differential counter gear set having a plurality of intermeshing gears which are driven by the drive motor 3 by way the splined shaft 6, when the drive motor 3 is rotated in either of two opposite directions, for transferring power from the rotating shaft 6 to actuate the brake 8. The gear train 10 includes means 11 for providing sufficient lost motion upon reversal of gear rotation with a change in operating direction of the drive motor 3 to allow release of the brake 8 from a braked condition upon reversal of the direction of rotation of the splined shaft 6. In the illustrated embodiment, the means 11 is a jaw clutch located between respective idle gears 12 and 13 of the differential counter gear set 10.

Figure 3:
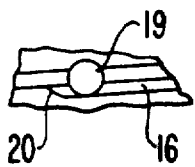
FIG. 3 is a cross-sectional view of the end of a groove with ball-ramp in the first gear of the differential counter gear set of the brake stop, as seen along the section line III—III in FIG. 2.

The brake stop 7 of the invention utilizes the differential counter gear set 10 to actuate a ball-ramp mechanism 14 of the actuator mechanism 9 and, in turn, a spring loaded brake pack 15 to provide a soft stop at the respective ends of travel of the wing sweep mechanism 2. The ball-ramp mechanism 14 comprises tangential ball grooves 16 formed in adjacent faces of first and fourth gears 17 and 18 of the differential counter gear set 10. Opposed grooves 16 in cooperation with intermediate balls 19 of the mechanism 14 permit limited lost motion between the first and fourth gears 17 and 18 of the differential counter gear set during rotation of the shaft 6. Ramps 20 (FIG. 3) at the end of the ball grooves result in axial translation of the fourth gear 18 relative to the first gear 17 to provide the brake pack axial clamping force for stopping rotation of the splined shafts 5 and 6, the drive motor 3 and the ball screw mechanism of the wing sweep mechanism 2 thereby limiting wing sweep to a predetermined amount.

Figure 4:
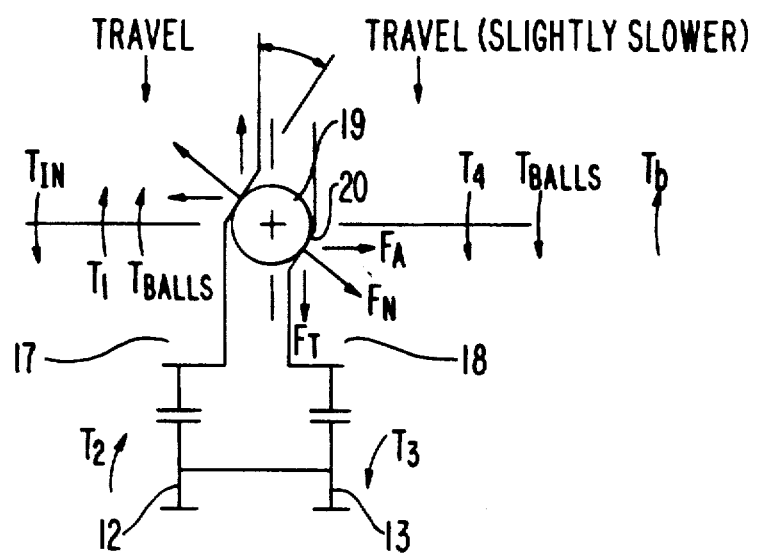
FIG. 4 is a schematic illustration and force diagram of a ball of the ball-ramp mechanism of the brake stop of FIG. 1.

To insure brake release after application of the brake 8 with reversal of the direction of operation of the drive motor 3, the gear ratio of the gear train 10 must be set such that the fourth gear 18 rotates slower than the first gear 17. The gear ratio in the illustrated embodiment is 1.0005, for this purpose. This allows the torque load transmitted through the balls 19 and gears to act in the same direction and oppose the brake torque $T_b$, as illustrated in FIG. 4. According to a further feature of the invention, the brake gain (brake torque/ball torque) must be greater than 1.0 and sufficient lost motion or backlash must be built into the differential counter gear set to allow release of the brake from a braked condition upon reversal of the direction of rotation of the drive motor and splined shafts 5 and 6. The jaw clutch 11 between the idle gears 12 and 13 permits backlash 21, see FIG. 2, to allow the balls 19 to roll back down the ramps 20 and release the brake 8 after stop actuation. Alternatively, or in addition to the jaw clutch 11, the gear meshes between the first gear 17 and idle gear 12 and between idle gear 13 and fourth gear 18 can be modified to provide extra backlash.

Where, for example, it is desired that the fourth gear 18 be axially translated away from the first gear 17 along the axis of rotation A—A of the rotating shafts 5 and 6 and in the direction of the brake pack 15 of brake 8 an amount of 0.030 inch for the purpose of applying brake 8, and the ramps 20 at the ends of the grooves 16 are sloped at an angle of 45° outward from the respective planes of the grooves 16, the balls 19 must move up each of the opposing ramps in the grooves 16 of the gears 17 and 18 a circumferential distance of 0.015 inch. Thus, for releasing the applied brake 8, it is preferable that the lost motion or backlash in the differential counter gear set upon reversal of the direction of rotation of the gears be sufficient to allow the balls 19 to rolls down the ramps 20 to release the brake 8. Namely, a distance of at least 0.015 inch relative rotation of the gears 17 and 18 along the circumference of the ball grooves 16 is required. This lost motion or backlash is provided by the jaw clutch 11 in the embodiment of FIG. 1 but, as noted above, alternatively or in addition, backlash can be provided between the intermeshing teeth of gears 12 and 17 and between gears 13 and 18.

The first gear 17 of the differential counter gear set 10 is splined to the shaft 6 for rotation with the shaft. A housing 22 rotatably supports the shaft 6 and first gear 17 rotated therewith by way of bearings 23 and 24. A shaft 25 is supported at its respective ends by the housing 22 and, in turn, rotatably supports idle gears 12 and 13 of the gear train 10 and jaw clutch 11 therebetween. The axis B—B of the shaft 25 is parallel to the axis A—A of the shaft 6. Fourth gear 18 of the differential counter gear set 10 is rotatably supported on a flange 26 of the first gear 17 for rotation about the axis A—A of the shaft 6. The balls 19 of the ball-ramp mechanism also guide the rotary movement of the fourth gear 18 and cause it to shift axially along the axis A—A relative to the first gear 17 when the balls move up the ramps 20 in the first and fourth gears 17 and 18 at the respective ends of travel permitted by the ball-ramp mechanism 14.

The brake pack 15 comprises a plurality of annular plates 27. Alternate ones of the plates 27 are connected to the housing 22 and the fourth gear 18 by pins and slots in a conventional manner. Annular Bellville springs 28 and 29 are located between the right end of the brake pack and the housing as illustrated in FIG. 1 for biasing the brake pack in the direction of the fourth gear 18. The springs 28 and 29 are designed to provide a dual spring rate to accommodate friction coefficient variations. Spring 28 has a moderate spring rate and is compressed first with axial translation of the fourth gear 18 in the direction of the brake as a result of operation of the ball-ramp mechanism 14. Spring 29 has a larger spring rate and is compressed in parallel with the spring 28. Thus, if the coefficient of friction between the respective plates 27 of the brake pack 15 is high, most of the stop travel occurs with moderate axial forces to limit the brake torque. With low coefficients of friction, the system is still rotating with low brake torque when spring 29 is reached. Spring 29 raises the axial load and brake torque to limit the total system travel.

The brake torque $T_b$ from the brake 8 is defined by the expression $T_b = u\, R_m\, N\, F_a$ where u is the coefficient of friction, $R_m$ is the mean radius to the brake plates, N is the number of brake plate surfaces and $F_a$ is the axial force against the brake plates.

The ball torque $T_{ball}$ on the balls 19 of the ball ramp mechanism 14 during the application of the brake 8 is defined by the expression $T_{ball} = R\, F_a \tan \alpha$ where R is the radius to the balls, $\alpha$ is the ramp angle of the ramps 20 of the ball ramp mechanism 14 and $F_a$ is the applied axial force.

The brake gain is defined by:

$$\text{Brake gain} = \frac{T_b}{T_{ball}} = \frac{uRmN}{R\tan\alpha} = BG \quad (A)$$

The torque in the fourth gear 18, $T_4$, is:

$$TT_4 = T_{ball} + T_{gear} - T_b = 0 \quad (B)$$

produces $$(BG-1)T_{ball} = T_{gear} \quad (C)$$

Figure 5A:
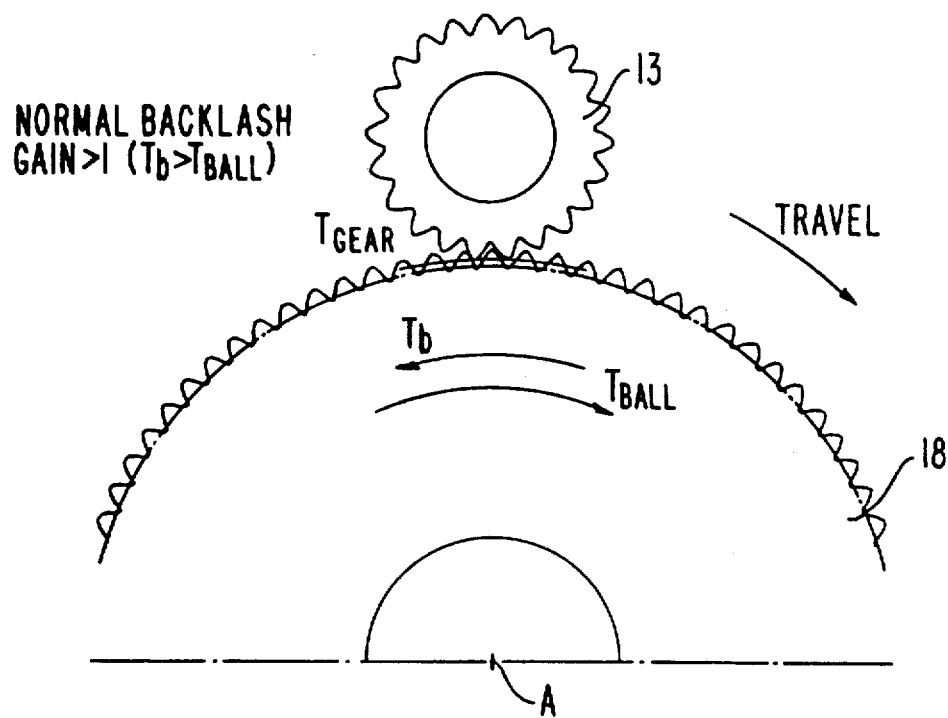
FIG. 5A is a schematic diagram of two gears of the differential counter gear set in the case of normal backlash.
Figure 5B:
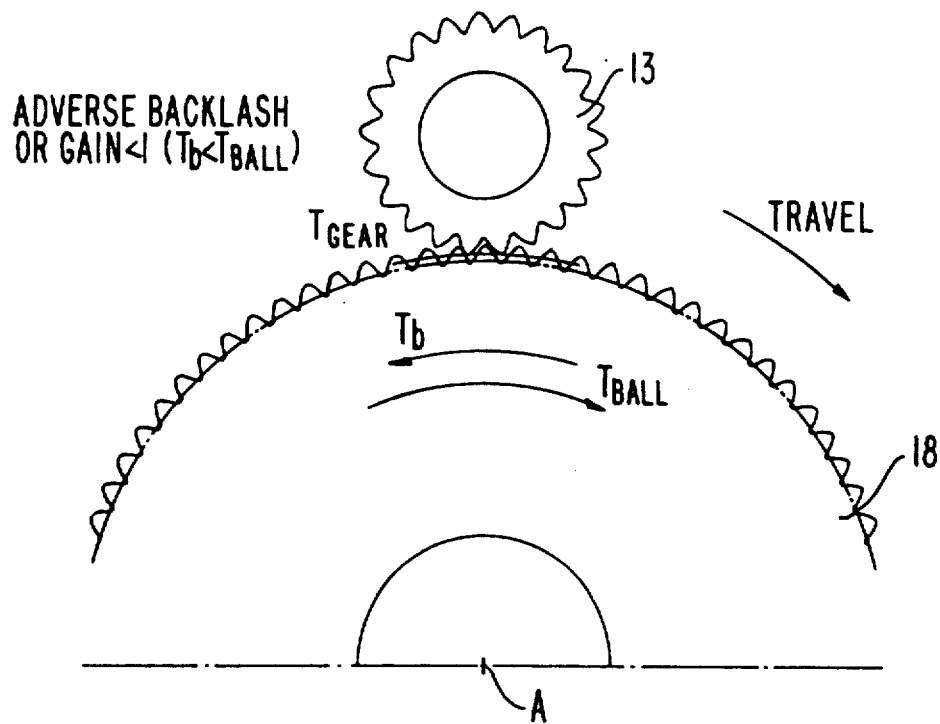
FIG. 5B is a similar diagram in the case of adverse backlash.

If the brake gain is less than 1 the ball torque and gear torque reverse signs and torque is locked up between first and fourth gears 17 and 18 of the actuator mechanism 9 making it difficult to release the brake. If gear 18 rotates faster than gear 17 torque will also be locked up in the gear train at brake application making brake release difficult, see FIG. 5B for this case. Therefore, the brake gain of the brake 8 of the invention must be greater than 1, fourth gear 18 must rotate slower than first gear 17 and backlash or lost motion upon reversal of the direction of rotation gears 17 and 18 must exist between gears 17 and 18 for the brake to release.

The brake stop 7 of the invention further comprises a backlash control device 30 to insure controlled brake application. The device 30 in FIG. 1 applies torque to the fourth gear 18 in the direction of the brake torque, $T_b$ in FIG. 4, throughout the ball ramp movement. Without a backlash control device, the following undesirable events would occur during operation of the brake stop. Gears 17 and 18 would rotate as usual until the balls 19 are at the base of the ball ramps 20. Gear 17 continues to rotate. If torsional drag on the gear 18 is low, a small axial load on the gear 18 from gravity or maneuver loads can cause gear 18 to move at the same speed as gear 17 through the available backlash. The balls 19 stay parked at the base of ball ramp 20. System deceleration could also do this. Gear 18 slows to its usual speed once backlash is removed in the adverse direction, as in FIG. 5, $T_b=0$. The balls 19 climb the balls ramps 20, pushing gear 18 toward the brake pack of brake 8. Brake torque then acts on the gear 18 after brake application. The gear 18 is quickly decelerated by the brake, forcing gear 18 back through the backlash until idle gear 13 is contacted, FIG. 5B-5A. The quick deceleration of gear 18 causes the balls 19 to travel quickly up the ball ramps 20 and compress the brake springs 28 and 29 rapidly. Rapid brake spring compression creates a much higher brake torque than desired Thus, instead of a controlled stop with steadily increasing spring load, the springs 28 and 29 are compressed rapidly which results in an overly aggressive brake action. These problems are avoided with the controlled brake application attained through the use of the backlash control device 30. In the form of the invention illustrated in FIG. 1, the backlash control device 30 comprises four gears 31-34, a helical torsion spring 35 and bearings 36 which support a shaft 37 in the housing 22. The shaft 37 rotatably supports the gears 32 and 33 with the helical torsion spring 35 interposed between the gears. The gear ratio of the four gears 31-34 is chosen such that the backlash control gears try to retard fourth gear 18 of the differential counter gear set. The helical torsion spring 35 winds up from its free position to create a torque in the same direction as $T_b$, FIGS. 5A and 5B, to force backlash in the proper direction.

Figure 6:
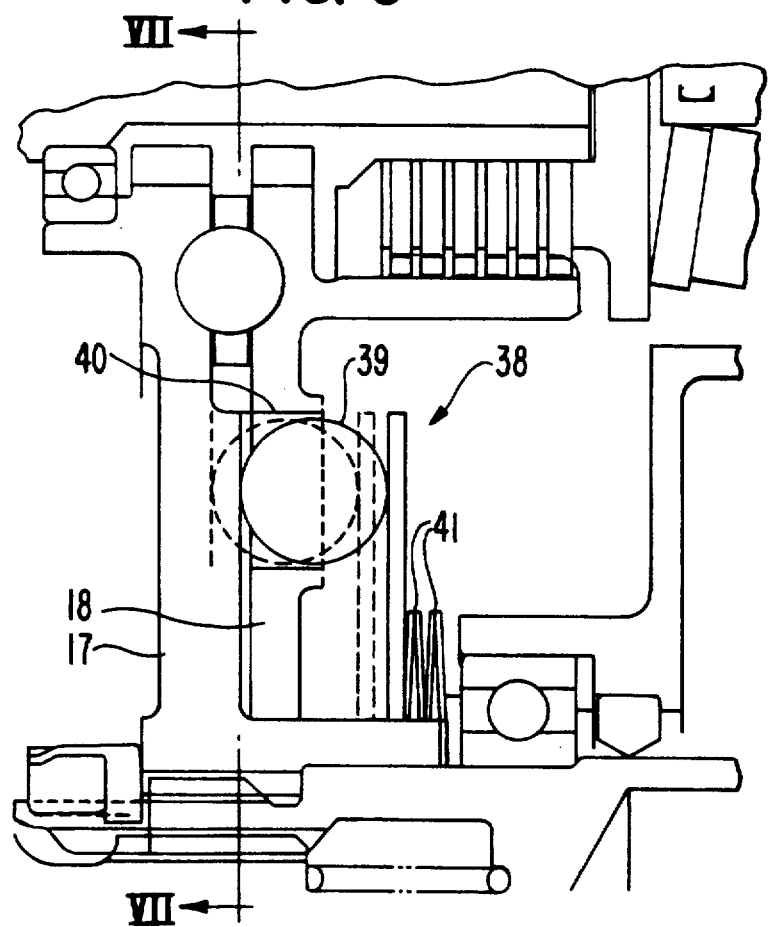
FIG. 6 is a cross-sectional view through a portion of a second embodiment of the brake stop of the invention showing a ball detent device for controlling backlash in the differential counter gear set when the rotating member approaches a predetermined amount of rotation corresponding to a desired end stop for the device to be actuated.
Figure 7:
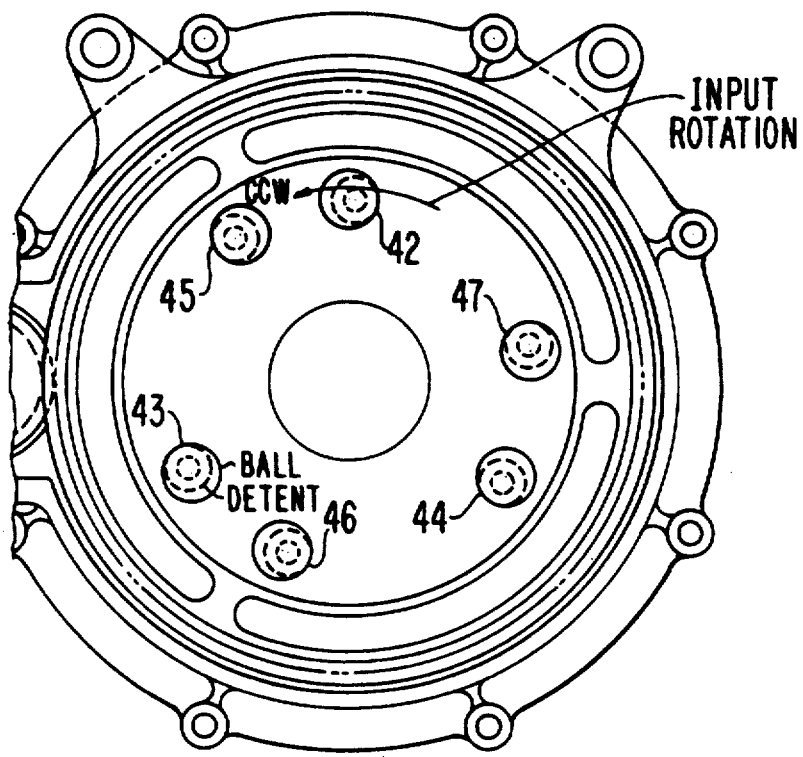
FIG. 7 is a cross-sectional view through the ball detent device of FIG. 6 taken along the line VII—VII.
Figure 8:
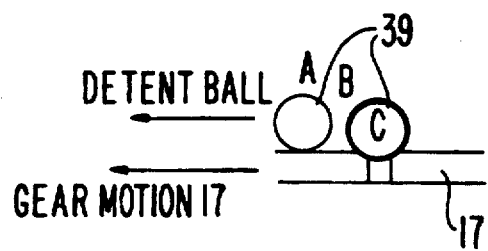
FIG. 8 is a schematic illustration of the relative relation of a ball of the ball detent device and an opening thereof in a gear of the differential counter gear set in respective positions A, B and C.

In another form of the invention, as shown in FIGS. 6-8, the backlash control device is a ball detent device 38 which replaces the helical torsion spring arrangement of the embodiment of FIG. 1. For this purpose, the first gear 17 of the differential counter gear set 10 contains detents or recesses. The gear 17 travels faster than three balls 39 which are provided in openings 40 in fourth gear 18 for travelling with the gear 18. Just before the ball ramp mechanism 14 causes axial movement of the fourth gear 18, a ball 39 is forced into a detent in the first gear 17 by spring 41. This is illustrated in FIG. 8 as ball 39 moves from position A to position B. The ball 39 forces the fourth gear 18 back to the normal backlash position of FIG. 5A. The ball 39 should not reach position C, fully bottomed, until after brake engagement. Detents 42, 43 and 44 direct backlash for counterclockwise motion of the first gear 17. Detents 45, 46 and 47 direct backlash for clockwise motion of first gear 17. Each of the three detent balls 39 can travel over several intermediate detents. For example, a ball 39 can initially control backlash in detent 42 for one end of stop mechanism travel. Ball 39 then travels over detents 45 and 43 before controlling backlash in detent 46 for the opposite end of stop mechanism travel. The backlash effects while in intermediate detents 45 and 43 are meaningless since they do not occur near a stop zone.

From the above, it is seen that the brake stop 7 and actuator 1 according to the invention provide bi-directional control for the wing sweep mechanism 2 with free movement of the wing mechanism between its respective ends of travel where the brake 8 is gradually applied to stop further movement and prevent overrun which would damage the mechanism. In the illustrated embodiment, the operating range permitted by the ball ramp mechanism 14 is 1,160 revolutions of the shaft 6 which in turn permits movement of the wing sweep mechanism 2 over a predetermined operating range of known positions. Once the brake 8 is engaged, the brake stop 7 permits reversal of the operating direction of the wing sweep mechanism by insuring release of the brake 8 without the use of one-way clutches or dual high and low efficiency screw threads as in the aforementioned prior art.

While we have shown and described only two embodiments in accordance with the present invention, it is understood that the same is not limited thereto, but is susceptible to numerous changes and modifications as known to those skilled in the art. Therefore, we do not wish to be limited to the details shown and described herein, but intend to cover all such changes and modifications as are encompassed by the scope of the appended claims.

We claim:

1. A brake stop for limiting the rotation of a rotating member, comprising a brake which is actuable for stopping rotation of the rotating member and an actuator mechanism responsive to the rotation of the rotating member for actuating the brake to stop rotation of the rotating member after a predetermined amount of rotation of the member, the actuator mechanism including a gear train having a plurality of intermeshing gears which are drivingly connected to said rotating member so that the gears are driven by the rotating member when the rotating member is rotated in either of two opposite directions for transferring power from the rotating member to actuate the brake, said gear train further including a mechanism providing sufficient lost motion upon reversal of the direction of gear rotation to allow release of the brake from a brake condition upon reversal of the direction of rotation of the rotating member.

2. The brake stop according to claim 1, wherein said mechanism providing sufficient lost motion is a jaw clutch located between two gears of the drive train.

3. The brake stop according to claim 1, wherein the mechanism providing sufficient lost motion is backlash provided between gear teeth of the intermeshing gears of the gear train.

4. The brake stop according to claim 1, wherein the gear train comprises a differential counter gear set.

5. The brake stop according to claim 4, wherein said differential counter gear set comprises a first gear connected to said rotating member for rotation therewith, second and third idle gears rotatably connected to each other for rotation about a common axis spaced from an axis of rotation of the rotating member, said second idle gear intermeshing with said first gear and a fourth gear rotatably supported adjacent said first gear for rotation about the axis of rotation of the rotating member and relative to the first gear, said third gear intermeshing with said fourth gear for rotatably driving the fourth gear in response to rotation of the rotating member, the gear ratios of said intermeshing gears of said differential counter gear set being selected so that said fourth gear is rotated slower than said first gear with rotation of said rotating member.

6. The brake stop according to claim 5, wherein the actuator mechanism further comprises a ball ramp mechanism formed between said first and fourth gears for transmitting rotary motion from the rotating member into linear motion for actuation of the brake after a predetermined amount of rotation of the rotating member.

7. The brake stop according to claim 1, wherein said brake has a gain greater than one.

8. The brake stop according to claim 1, wherein said brake stop is bidirectional in that said actuator mechanism responds to rotation of the rotating member in either of two opposite directions about an axis of rotation of the rotating member to actuate the brake to stop rotation after a predetermined amount of rotation.

9. The brake stop according to claim 1, wherein the actuator mechanism comprises a ball-ramp mechanism for transmitting rotary motion from the rotating member by way of the gear train into linear motion for actuation of the brake after a predetermined amount of rotation of the rotating member.

10. The brake stop according to claim 9, wherein the ball-ramp mechanism is located between a pair of adjacent gears of said gear train.

11. The brake stop according to claim 1, further comprising backlash control device in said gear drive which controls backlash at least when said rotating member approaches said predetermined amount of rotation.

12. The brake stop according to claim 11, wherein said backlash control device applies a torque to said gear train in the same direction as a braking torque applied to said gear train by said brake when said brake is actuated.

13. The brake stop according to claim 12, wherein said backlash control device comprises a helical torsion spring which is wound up in response to the driving of the gear train by the rotating member for applying torque to the gear train in the same direction as the braking torque.

14. The brake stop according to claim 12, wherein said backlash control device comprises a ball detent device which is actuated by movement of the gear train to apply a torque thereto in the same direction as the braking torque when the rotating member approaches the predetermined amount of travel.

15. The brake stop according to claim 1, wherein said brake comprises a brake pack which is pressed by said actuator mechanism for actuating the brake and dual springs yieldably resisting the pressure on said brake pack from said actuator mechanism, said dual springs including a first spring with relatively lower spring rate which results in a relatively lower load on the brake pack and consequently relatively lower brake torque during an initial compression of the springs and a second spring with relatively higher spring rate which results in a relatively higher load on the brake pack and consequently relatively higher brake torque during a further compression of the springs.

16. A brake stop for limiting the rotation of a rotating member, comprising a brake which is actuable for stopping rotation of the rotating member and an actuator mechanism responsive to the rotation of the rotating member for actuating the brake stop rotation of the rotating member after a predetermined amount of rotation of the rotating member, the actuator mechanism including a differential counter gear set driven by the rotating member for transferring power from the rotating member to actuate the brake, and a ball-ramp mechanism being located between respective gears of the differential counter gear set for transmitting rotary motion from the rotating member by way of the differential counter gear set into linear motion for actuation of the brake after a predetermined amount of rotation of the member, and a backlash control device for controlling backlash in the differential counter gear set at least when the rotating member approaches the predetermined amount of rotation.

17. An actuator for operating a device with a preprogrammed limited stroke, comprising a motor for operating the device, a member which is driving connected to the motor such that the member is rotated by the motor during operation of the device, the member being adapted to be stopped from rotating for stopping the operation of the device to thereby limit the stroke thereof to a predetermined amount, and a brake stop for limiting the rotation of the member and thereby the stroke of the device to a preprogrammed amount, said brake stop including a brake which is actuable for stopping rotation of the rotating member and an actuator mechanism responsive to the rotation of the rotating member for actuating the brake to stop rotation of rotating member after a predetermined amount of rotation of the rotating member, the actuator mechanism including a gear train having a plurality of intermeshing gears which are driven by the rotating member when rotated in either of two opposite directions for transferring power from the rotating member to actuate the brake, and the gear train further including a mechanism providing sufficient lost motion upon reversal of gear rotation to allow release of the brake from a braked condition upon reversal of the direction of rotation of the rotating member.

18. The actuator according to claim 17, wherein said mechanism providing sufficient lost motion comprises a jaw clutch located between two gears of the drive train.

19. The actuator according to claim 17, wherein the mechanism providing sufficient lost motion comprises backlash provided between gear teeth of the plurality of intermeshing gears.

20. The actuator according to claim 17, wherein the gear train comprises a differential counter gear set.

21. The actuator according to claim 20, wherein said differential counter gear set comprises a first gear connected to the rotating member for rotation therewith, second and third idle gears connected to each other for rotation about a common axis spaced from an axis of rotation of the rotating member, the second idle gear intermeshing with the first gear, and a fourth gear rotatably supported adjacent the first gear for rotation about the axis of rotation of the rotating member and relative to the first gear, said third gear intermeshing with said fourth gear for rotatably driving the same in response to the rotation of the rotating member, the gear ratios of the intermeshing gears of the differential counter gear set being selected so that said fourth gear is rotated slower than said first gear with rotation of said rotating member.

22. The actuator according to claim 20, wherein the actuator mechanism further comprises a ball-ramp mechanism formed between the first and fourth gears for transmitting rotary motion from the rotating member into a linear motion for actuation of the brake after a predetermined amount of rotation of the member corresponding to a preprogrammed limited stroke of the device.

23. The actuator according to claim 17, wherein said brake has a gain greater than one.

24. The actuator according to claim 17, wherein the brake stop is bidirectional in that said actuator mechanism responds to rotation of the rotating member in either of two opposite directions about an axis of rotation of the rotating member to actuate the brake to stop rotation after a predetermined amount of rotation.

25. The actuator according to claim 17, wherein the actuator mechanism comprises a ball-ramp mechanism for transmitting rotary motion from the rotating member by way of the gear train into linear motion for actuation of the brake after a predetermined amount of rotation of the member corresponding to a preprogrammed, limited stroke of the device.

26. The actuator according to claim 25, wherein the ball-ramp mechanism is located between a pair of adjacent gears of the gear train.

27. The actuator according to claim 17, further comprising a backlash control device for controlling backlash in the gear drive at least when the rotating member approaches the predetermined amount of rotation.

28. The actuator according to claim 27, wherein said backlash control device applies a torque to the gear train in the same direction as a braking torque applied to the gear train by the brake when the brake is actuated.

29. The actuator according to claim 28, wherein said backlash control device is a helical torsion spring which is wound up in response to the driving of the gear train by the rotating member for applying a torque to the gear train in the same direction as the braking torque.

30. The actuator according to claim 28, wherein said backlash control device is a ball detent device which is actuated by movement of the gear train to apply a torque thereto in the same direction as the braking torque when the rotating member approaches the predetermined amount of travel.

31. The actuator according to claim 17, wherein the brake comprises a brake pack which is pressed by the actuator mechanism for actuating the brake and a dual spring for yieldably resisting the pressure on the brake pack from the actuator mechanism, the dual spring including a first spring having a relatively lower spring rate which results in a relatively lower load on the brake pack and consequently relatively lower brake torque during an initial compression of the dual spring and a second spring having a relatively higher spring rate which results in a relatively higher load on the brake pack and consequently relatively higher brake torque during a further compression of the dual spring.

* * * * *